US008762462B1

(12) United States Patent
Duddu et al.

(10) Patent No.: US 8,762,462 B1
(45) Date of Patent: Jun. 24, 2014

(54) SUGGESTING A RECIPIENT OF CONTENT

(75) Inventors: Sarveshwar Duddu, Bangalore (IN); Kartik Singh, New Delhi (IN)

(73) Assignee: Google Inc., Mountain View, CA (US)

( * ) Notice: Subject to any disclaimer, the term of this patent is extended or adjusted under 35 U.S.C. 154(b) by 324 days.

(21) Appl. No.: 13/402,842

(22) Filed: Feb. 22, 2012

(51) Int. Cl.
*G06F 15/16* (2006.01)

(52) U.S. Cl.
USPC ........................................... 709/204; 709/224

(58) Field of Classification Search
USPC ......................................... 709/204, 223–224
See application file for complete search history.

(56) References Cited

U.S. PATENT DOCUMENTS

| | | | |
|---|---|---|---|
| 2009/0182589 | A1 | 7/2009 | Kendall et al. |
| 2010/0287033 | A1* | 11/2010 | Mathur ........................... 705/10 |
| 2011/0004831 | A1 | 1/2011 | Steinberg et al. |
| 2011/0066507 | A1* | 3/2011 | Iyer et al. .................... 705/14.66 |
| 2011/0093415 | A1* | 4/2011 | Rhee et al. ....................... 706/12 |
| 2011/0153423 | A1* | 6/2011 | Elvekrog et al. ............ 705/14.53 |
| 2012/0054278 | A1* | 3/2012 | Taleb et al. .................... 709/204 |
| 2012/0203846 | A1* | 8/2012 | Hull et al. ...................... 709/204 |
| 2013/0165234 | A1* | 6/2013 | Hall et al. ........................ 463/42 |
| 2013/0204825 | A1* | 8/2013 | Su ................................... 706/46 |

OTHER PUBLICATIONS

"Products—McAfee Family Protection", McAfee for Home, 2011, retrieved from <http://home.mcafee.com/store/family-protection?ctst=1>.

"Welcome to Christian School Products—Using Content Filtering with Social Media Sites", Christian School Products, 2012, retrieved from <http://www.christianschoolproducts.com/articles/2010-June/Featured-Articles/Using-Content-Filtering-with-Social-Media-Sites.htm>.

Murray, Jessica, "Don't Confuse Content Curation for Content Filtering", Social Media Club, May 20, 2011, retrieved from <http://socialmediaclub.org/blogs/from-the-clubhouse/dont-confuse-content-curation-content-filtering>.

"Guided Tour—Scoop.itFree", Scoop.it!, last viewed Feb. 22, 2012, retrieved from <http://www.scoop.it/pricing/guided-tour#Free>.

Carr, Austin, "Flavors.me Wants to Curate Your Fragmented Social Media", Fast Company, Nov. 29, 2011, retrieved from <http://www.fastcompany.com/1797821/flavorsme-wants-to-curate-your-fragmented-social-media>.

Rao, Leena, "DataSift Launches Powerful Twitter Data Analysis and Business Intelligence Platform", TechCrunch, Nov. 16, 2011, retrieved from <http://techcrunch.com/2011/11/16/datasift-launches-powerful-twitter-data-analysis-and-business-intelligence-platform/>.

* cited by examiner

*Primary Examiner* — Philip B Tran
(74) *Attorney, Agent, or Firm* — McDermott Will & Emery LLP

(57) ABSTRACT

A system and method for suggesting a recipient of content. An interest profile of at least one contact of a user is determined based on at least one endorsement action of the at least one contact directed to a type of content. A type of content of an unpublished post of the user is determined. The at least one contact is identified as a suggested recipient of the unpublished post of the user based on the interest profile of the at least one contact and the type of content of the unpublished post of the user. The suggested recipient of the unpublished post of the user is provided for display.

24 Claims, 7 Drawing Sheets

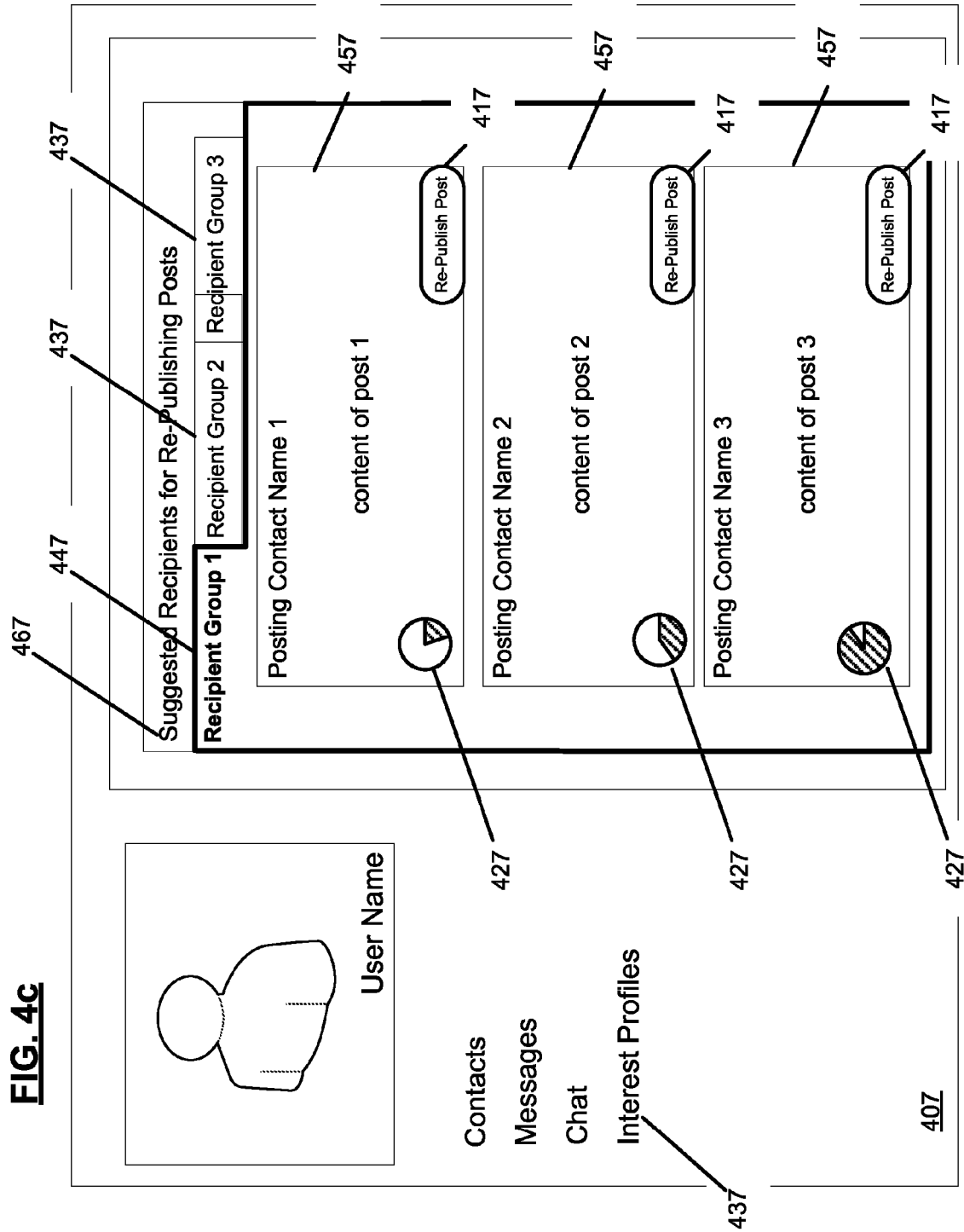

SUGGESTING A RECIPIENT OF CONTENT

BACKGROUND

1. Field

The present disclosure generally relates to sending content to recipients and, more particularly, to suggesting a recipient of the content.

2. Description of the Related Art

Social networks, email, and other online content sharing platforms currently allow users to send, create, and share content with other users.

SUMMARY

The disclosed subject matter relates to suggesting a recipient of content. The method includes determining an interest profile of at least one contact of a user based on at least one endorsement action of the at least one contact directed to a type of content and determining a type of content of an unpublished post of the user. The method includes identifying the at least one contact as a suggested recipient of the unpublished post of the user, the identification based on the interest profile of the at least one contact and the type of content of the unpublished post of the user. The method additionally provides for display the suggested recipient of the unpublished post of the user.

The disclosed subject matter further relates to a system for suggesting a recipient of content. The system includes one or more processor(s) and a memory containing processor-executable instructions. When executed by the processor(s), the system determines an interest profile for each contact of a plurality of contacts of the user based on at least one endorsement action of the respective contact directed to a type of content and determines a type of content of an unpublished post of the user. The system also identifies multiple ones of the plurality of contacts as a group of suggested recipients of the unpublished post of the user, the identification based on the interest profiles of the multiple ones of the plurality of contacts and the type of content of the unpublished post of the user. The system also provides for display the group of suggested recipients of the unpublished post of the user.

The disclosed subject matter also relates to a non-transitory machine-readable storage medium comprising machine-readable instructions for suggesting a recipient of content. The method includes determining an interest profile for each contact of a plurality of contacts of the user based on at least one endorsement action of the respective contact directed to a type of content and determining a type of content of an unpublished post of the user. The method further includes identifying multiple ones of the plurality of contacts as a group of suggested recipients of the unpublished post of the user, the identification based on the interest profiles of the multiple ones of the plurality of contacts and the type of content of the unpublished post of the user. The method further includes aggregating the interest profiles of each suggested recipient of the group of suggested recipients to form a group interest profile corresponding to the group of suggested recipients and providing for display the group of suggested recipients of the unpublished post of the user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Certain features of the subject technology are set forth in the appended claims. However, for the purpose of explanation, several aspects of the subject technology are set forth in the following figures.

FIG. 4c is an illustration of another example user interface for suggesting a recipient of content.

DETAILED DESCRIPTION

Figure 1:
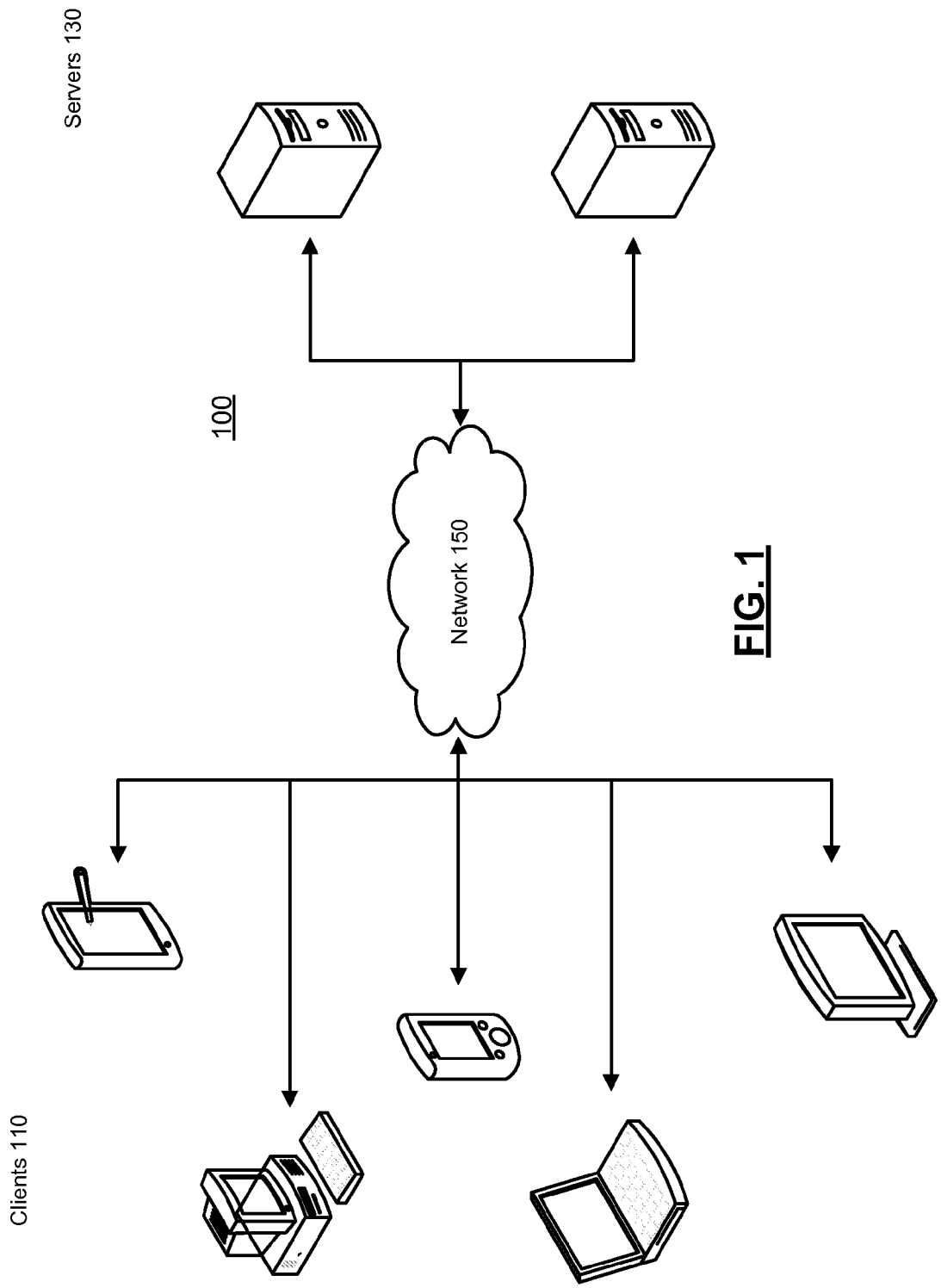
FIG. 1 illustrates an example system for suggesting a recipient of content.

In the following detailed description, numerous specific details are set forth to provide a full understanding of the subject technology. It will be apparent, however, that different aspects of the subject technology may be practiced without some of these specific details. In other instances, well-known structures and techniques have not been shown in detail so as not to obscure the disclosure.

The disclosed subject matter describes systems and techniques for suggesting a recipient of content. Interest profiles for at least one contact of a user is determined based on at least one endorsement action of the contact that is directed to at least one type of content. The term "interest profile" as used herein encompasses its plain and ordinary meaning, including, but not limited to a collection of data associated with a user, contact of a user, or group of users of an online content sharing platform. The collection of data relates to the types of content that the respective user, contact, or group views and/or performs endorsement actions on. The interest profile can, in some examples, be determined for each contact of the user and the user in a continuous or ongoing fashion. The interest profile can indicate the types of content that are favorably acted on by the contact. Accordingly, the interest profile provides a picture of the types of content that the contact frequently enjoys. Interest profiles can, in some examples, also be determined for groups and can take into consideration multiple levels of types of content. For instance, high-level types of content can, in some examples, include "music," "politics," "technology," and "food." Each high-level type of content can include several sub-types of content. For example, the type of content "food" can include sub-topics such as "restaurants" or "recipes." A type of content can be associated with other types or sub-types of content such as "French cuisine" or "aspics." The interest profile can consider endorsement actions such as referring to multiple types of content at once. For instance, an article on aspics served at the presidential inaugural ball may be determined to be both in "French cuisine" and "aspics" as well as "food." The type of content of the article may also include "politics" as the article is also associated with a political event.

The term "endorsement action" as used herein encompasses the plain and ordinary meaning of the words, endorsement including, but not limited to any action taken by a user or contact of a user that indicates a positive inclination and/or interest towards a piece of content. Examples of endorsement actions include, but are not limited to, an indication of approval for a piece of content provided through user interaction with a graphical component; a recommendation of a piece of content; a re-post of a piece of content; multiple views of a piece of content; a comment on a piece of content; replying to a piece of content; forwarding a piece of content; saving a piece of content; sharing a piece of content; subscribing to a newsletter, blog, micro blog, or periodical publication; and multiple searches for a piece or type of content.

The type of content of an unpublished post of the user is determined. More than one type of content can, in some examples, be determined for the unpublished post and the type of content may be any one or multiple types of content that are considered in the identification of the interest profile for the user or user's contacts. The user's unpublished post can include content that the user has received from another contact, content that the user wishes to republish, content generated by the user, or a combination. The type of content can be determined by text analysis, can be determined based on previous postings of the content, or can be determined based on information provided by user entry.

The unpublished post of the user includes posts of the user that are capable of being published to a stream of content of other users, the user's contacts, or groups of the user's contacts. An unpublished post may be copied and pasted from another source, composed by the user, or otherwise entered into a portion of the user's interface that allows the user to send the unpublished post to another user or group of users. An unpublished post of the user can, in some examples, additionally be content that is displayed to the user in a manner that allows the user to publish the unpublished post to another user by clicking, passing a mouse over, or otherwise selecting a graphical component.

At least one contact is identified as a suggested recipient of the unpublished post of the user based on the interest profile of the contact and the type of content of the unpublished post of the user. For instance, contacts whose interest profiles indicate a large number of endorsement actions or a large percentage of overall endorsement actions for the type of content "food" may be suggested as a recipient for an unpublished post with a type of content for "food." A group of contacts, generated based on interest profiles or from a pre-existing or user established group, can be suggested as recipients. Any combination of individual contacts, groups determined based on interest profile, and pre-existing, user established groups can be suggested as recipients.

The suggested recipient of the unpublished post of the user is then provided for display. The display can, in some examples, be provided following a request for the suggested recipients entered by the user through a graphical component or may automatically be provided for display. An icon indicating interest for the type of content or a portion of the suggested recipient's interest profile can be displayed. The display may provide further access to the contact names of a group of suggested recipients and some or all of the interest profiles of those suggested recipients. The display can provide access to the group interest profile of a group of suggested recipients.

The user can, in some examples, adjust appropriate privacy settings to selectively limit the types of information that is shared with other users. Users can, in some examples, adjust appropriate privacy settings to selectively limit the types of information that are disseminated to other users.

Turning to the drawings, FIG. 1 illustrates an example system 100 for suggesting a recipient of content. The system 100 includes clients 110 and servers 130 connected over a network 150.

The system 100 is comprised of client(s) 110, server(s) 130 and the network 150 in any combination or configuration that allows for suggesting a recipient of content, including implementations with multiple servers 130. For instance, a user can interact with client 110 for the purposes of entering content for posting, selecting recipients to which the post will be entered, and viewing portions of interest profiles, among other interactions. Contacts of the user can also read or display pieces of content and perform endorsement actions on the pieces of content via client 110. Data input by the user and contacts of the user via client 110 can be sent over network 150 to server 130. The server 130 then determines interest profiles of the contacts of the user and the user, determines a type of content of an unpublished post of the user, and identifies the contact of the user based on the interest profile of the contact and the type of content of the unpublished post of the user. The suggested recipient is then provided from server 130 over network 150 for display on client 110.

Each of the clients 110 can be, for example, a desktop computer, a laptop computer, a mobile device (e.g., a smartphone, tablet computer, or PDA), a set top box (e.g., for a television), a video game console, or any other device having an appropriate processor, memory, and communications capabilities. In certain instances, different versions and/or configurations of the system that include subject technology as disclosed herein are available for download from a server 130 and subsequent installation on client 110. The servers 130 can be any device having a processor, memory, and communications capability for hosting the data for installing and hosting the system. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a ring network, a mesh network, a star-bus network, tree or hierarchical network, and the like.

Figure 2:
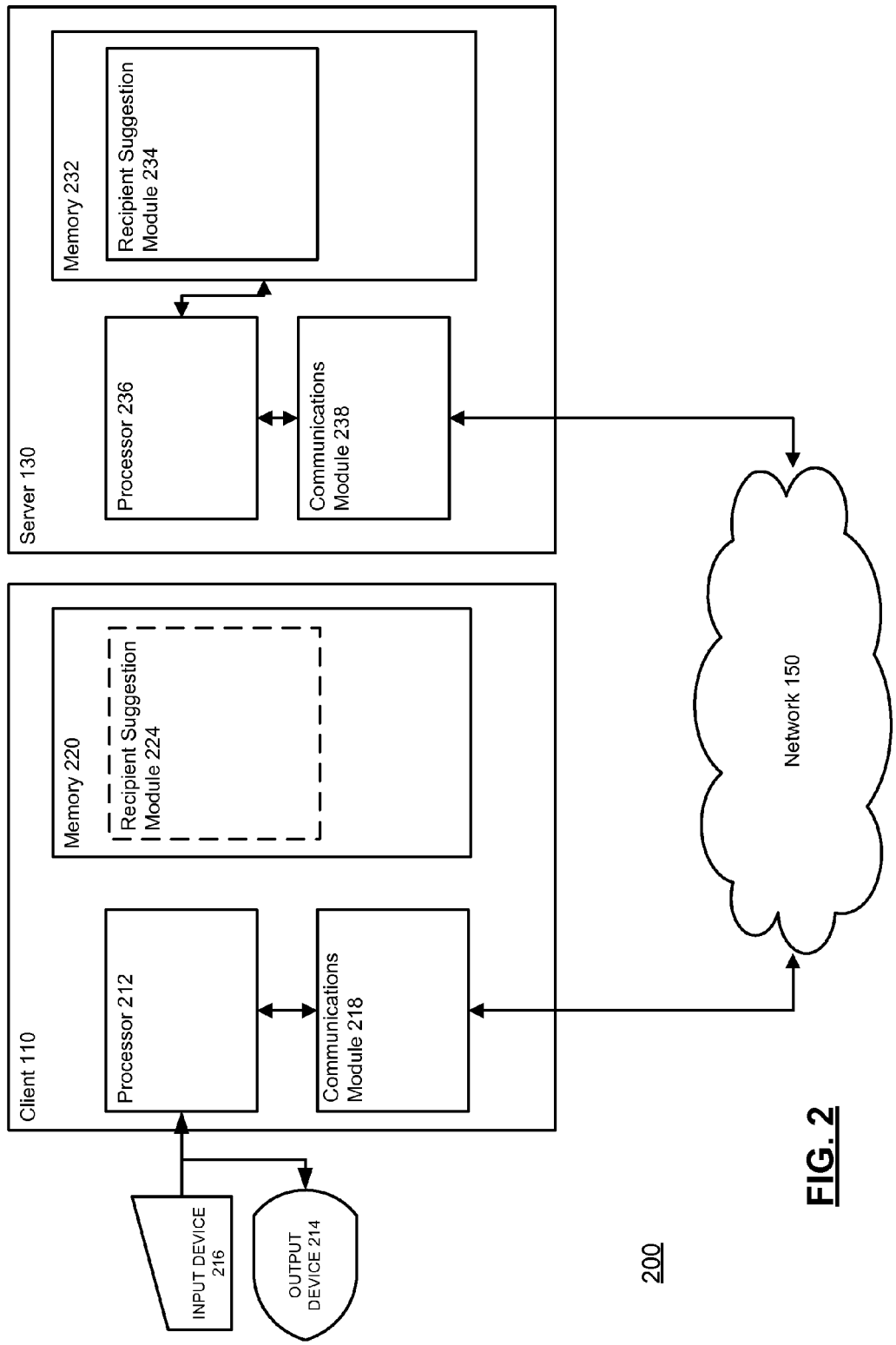
FIG. 2 is a block diagram illustrating an example client and server from the system of FIG. 1.

FIG. 2 is a block diagram illustrating an example client and server from the system 100 of FIG. 1 according to certain aspects of the subject technology. The client 110 and the server 130 are connected over the network 150 via respective communications modules 218 and 238 and are configured to interface with the network 150 to send and receive information, such as data, requests, responses, and commands to other devices on the network. The communications modules 218 and 238 can be, for example, modems or Ethernet cards.

The client 110 includes a processor 212, a communications module 218, and a memory 220 that can, in some examples, include a recipient suggestion module 224. The processor 212 of the client 110 is configured to execute instructions, such as instructions physically coded into the processor 212, instructions received from software in memory 220, or a combination of both. For example, the input device 216 can provide textual information to processor 212 which is processed by a recipient suggestion module 224 stored in memory 220. The textual information can then be sent through network 150 via communications module 218 to server 130, which receives the information through communications module 238.

Server 130 includes a processor 236, a communications module 238, and a memory 232 that can include a recipient suggestion module 234. Processor 236 is configured to execute instructions, such as instructions physically coded into the processor 236, instructions received from software in memory 232, or a combination of both. Processor 236 processes information from recipient suggestion module 234 and sends information through communications module 238, through network 150, to client 110 to be displayed on output device 214.

In an alternative embodiment, a recipient suggestion module 224 can be downloaded directly to client 110 for off-line use with client 110. Services may differ from the services of recipient suggestion module 234 of server 130 in a client side implementation. For instance, recipient suggestion module 224 may use only information that is stored in memory 220 while off-line. For example, updated information regarding interest profiles of contacts of the user may not be available while client 110 is off-line.

Figure 3:
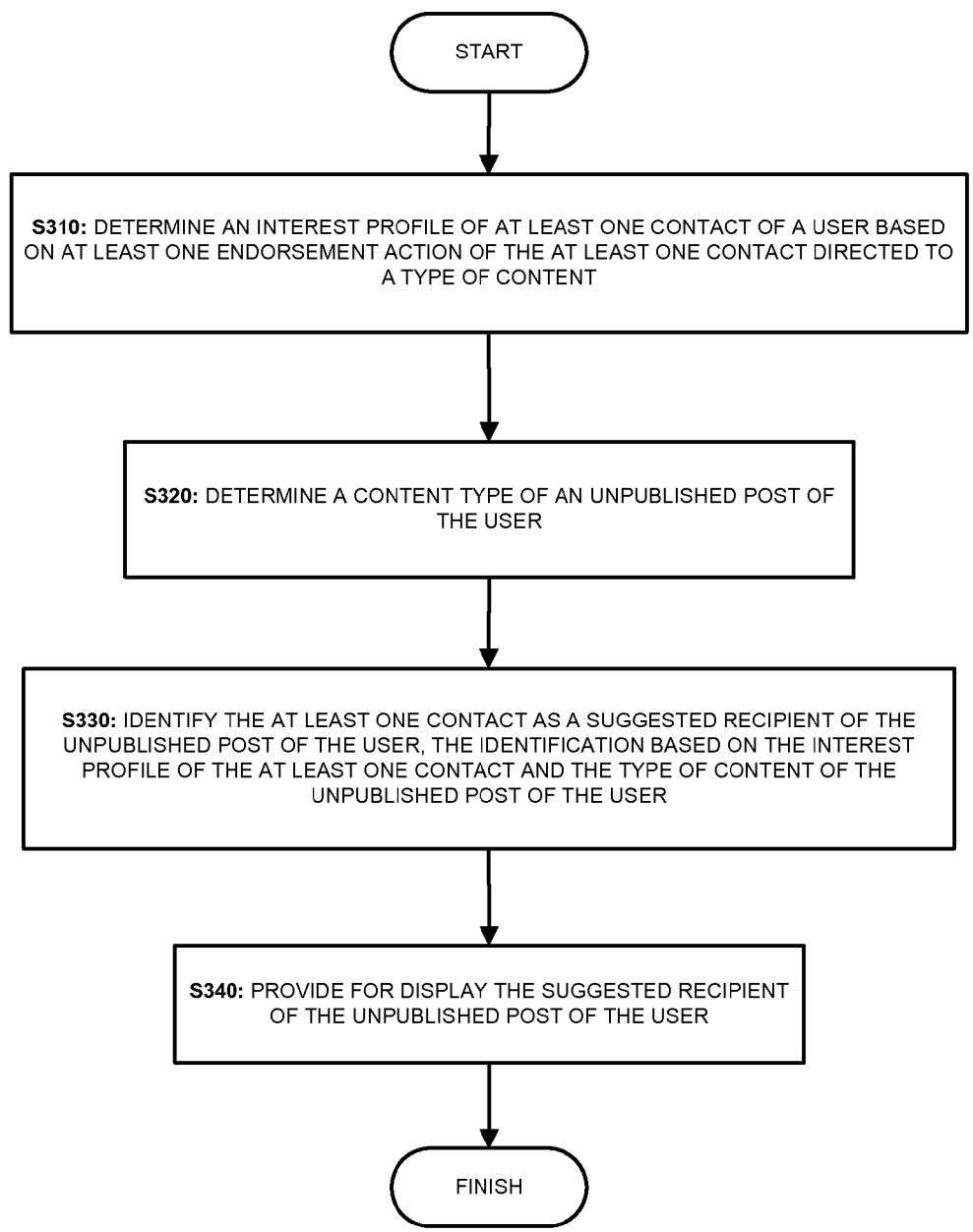
FIG. 3 illustrates an example process for suggesting a recipient of content.

FIG. 3 illustrates an example process 300 for suggesting a recipient of content as shown by the example client 110 and server 130 of FIG. 2 that can provide for suggesting a recipient of content. Although process 300 of FIG. 3 is described with reference to FIG. 2, the process 300 is not limited to such a configuration and can be applied to other systems and configurations.

The process begins with step S310, when recipient suggestion module 234 of server 130 determines an interest profile of at least one contact of a user based on at least one endorsement action of the at least one contact directed to a type of content. The system 200 can, in some examples, continuously or regularly update the interest profiles of each contact of the user. An interest profile for the user may additionally be determined. Endorsement actions of a contact can, in some examples, include an indication of approval for a piece of content, a re-post of a piece of content, a number of views of a piece of content, a comment on a piece of content, or the like. Endorsement actions of a contact may be limited to actions of a contact within a social networking website, or may be accumulated through multiple applications or websites. The interest profile of each contact of the user can, in some examples, be determined as a set of percentages or ratios of a number of endorsement actions for each type of content to a total number of endorsement actions of the contact. Endorsement actions can, in some examples, include multiple different types of actions, and ratios of interest may be differently weighted or compiled based on the type of action, the time span in which the actions are taken, the frequency with which a contact performs endorsement actions, or based on a total number of actions performed by the contact. Endorsement actions can be associated with one or more types of content. For instance, types of content may be hierarchically structured so that an endorsement action is considered for the top level type of content, as well as a sub-type of the content. The interest profile can, in some examples, contain different sets of statistics, percentages, or ratios based on each type of content, based on the levels of types of content, or based on the type of endorsement action performed.

In step S320, recipient suggestion module 234 of server 130 determines a type of content of an unpublished post of the user. The content of the unpublished post of the user may be entered via an input device 216 of client 110 and transmitted over network 150. Content of the unpublished post of the user can be entirely generated by the user, comprise or include content that was previously received in a post by the user, or comprise or include content from any other source. The determination of type of content can be performed as the user enters content or may take place after the user has completed entry of the content for the unpublished post. The type of content can be determined by text analysis, other automated method, or can be provided through user input. Type of content of the user's unpublished post can correspond to types of content that are established in the interest profiles of the user's contacts, including hierarchical content types. The unpublished post of the user may comprise multiple types of content.

In step S330, recipient suggestion module 234 of server 130 identifies the at least one contact as a suggested recipient of the unpublished post of the user, the identification based on the interest profile of the at least one contact and the type of content of the unpublished post of the user. The identification can be determined based on the interest profile of one or more contacts of the user. A suggested recipient can be determined if the respective contact's interest profile has a ratio of interest for the type of content of the message that is above a threshold. Suggested recipients can be determined comparative to the interest profile of the user's other contacts. For example, the five contacts having the greatest interest in the type of content of the message may be identified as suggested recipients. The recipient suggestion module 234 may accordingly determine a group of suggested recipients for the unpublished message based on the interest profiles of the individual contacts. Following the determination of a group of suggested recipients based on the respective interest profiles of the individual contacts, an aggregate interest profile for the suggested group of recipients may be determined. The group of suggested recipients can, in some examples, constitute a pre-existing, user established group of contacts. The determination of a pre-existing, user established group of contacts as a group of suggested contacts may be based on a group interest profile that has previously been determined based on the aggregation of the individual interests of the contacts that comprise the group.

The process ends in step S340 when the recipient suggestion module 234 of server 130 provides for display on client 110 the suggested recipient of the unpublished post of the user. The suggested recipient can automatically be provided for display in conjunction with the unpublished post of the user. The suggested recipient may be accessible from the user interface via a graphical component. That is, the user can select the graphical component to view the suggested recipient. The display can, in some examples, include a listing of user names or other identifying information associated with the suggested recipients. An indication of the interest profile of the suggested recipient can additionally be provided. For instance, an "interest meter" may be provided, which indicates the percent of the suggested recipient's endorsement actions that correspond with the type of content associated with the unpublished post. The "interest meter" can be a graphical component that provides further access to some or all of the suggested recipient's interest profile. The "interest meter" icon can correspond with a group of suggested recipients. Display of suggested recipients that constitute a group may include a list of the contacts in the group and may provide individual interest profiles of the members or an aggregated group interest profile.

Figure 4A:
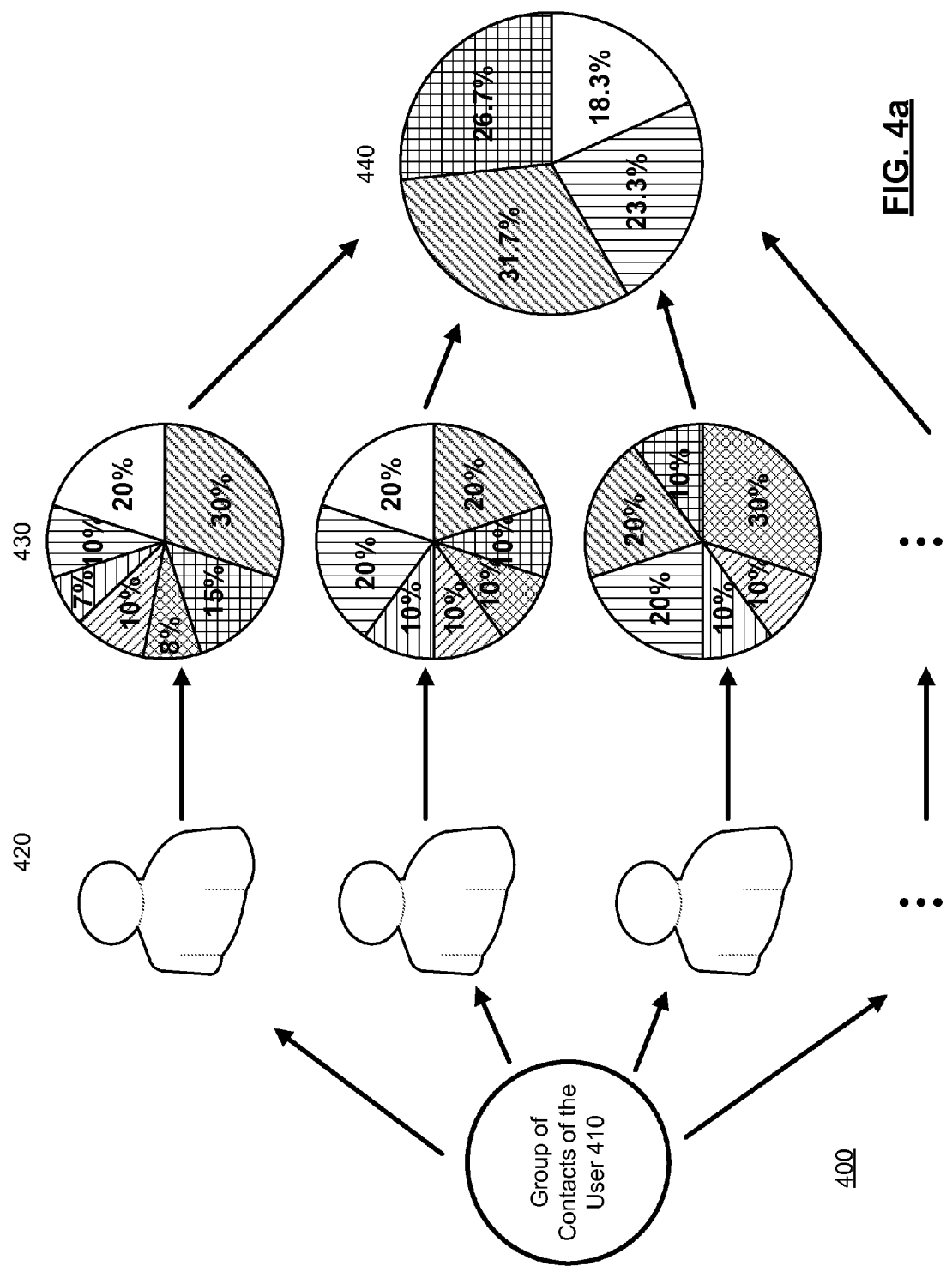
FIG. 4a is an illustration of the flow of aggregating a group interest profile as it relates to aspects of the subject technology.

FIG. 4a is a flow diagram illustrating an example process 400 of aggregating information from individual interest profiles to form a group interest profile for suggesting a recipient of content. A group of contacts of the user 410 may comprise a user-established group of contacts or a group may be determined based on a similarity found in multiple contacts' interest profiles. The user may designate a group of contacts at any time and may label or otherwise identify the group. The user may have the ability to include or exclude the group of contacts as recipients of a post without individually identifying each contact of the group. The group of contacts of the user 410 can, in some examples, be determined as a group of suggested recipients by recipient suggestion module 234 of server 130 specifically in consideration for receipt of an unpublished post that has been or is being drafted by the user. The group of contacts of the user 410 is comprised of multiple contacts 420. Although three contacts are explicitly shown, the group of contacts 410 may include any number of contacts, as illustrated by the ellipses under contacts 420. Each contact 420 can have an individual interest profile 430 that is determined based on the respective contact's endorsement actions. One expression of this interest profile may be in the form of a set of percents or a set of ratios of a number of endorsement actions for each type of content that the contact has performed to a total number of endorsement actions of the at least one contact of the user. A pie chart such as the pie charts representing the interest profiles 430 of each contact of the group can represent the total endorsement actions performed by the respective contact. Each differently patterned portion of the pie charts representing interest profiles 430 and 440 may represent a different type of content that has received endorsement actions from the respective contact or group. The percentages marked on the pie chart represent the percent of endorsement actions that have been performed for each type of content. Types of content that have had no endorsement actions associated with the contact may not appear in a pie chart representation such as those depicted in the figure; such information may, however, comprise part of a contact's interest profile. Varying representations of interest can be obtainable for each contact. For instance, in a hierarchical set of types of content, a pie chart may represent the highest level of types of content. Another pie chart may be available to represent each high-level type of content, with "slices" for each sub-type of content that the user has performed an endorsement action on. The relevant information from the interest profile can be chosen by recipient suggestion module 234 of server 130 based on the type of content of the user's unpublished post. Each pie chart representing an interest profile 430, however, represents the same level of type of content (e.g., each pie chart 430 for each contact may be a single sub-topic, or each pie chart 430 for each contact may be a high-level type of content pie chart). A group interest profile 440 can be formed based on the individual profiles of each contact of the group of contacts of the user 410. The group interest profile 440 can be compiled by an average or weighted average of the interest profiles 430 of each of the contacts of the group 410.

Figure 4B:
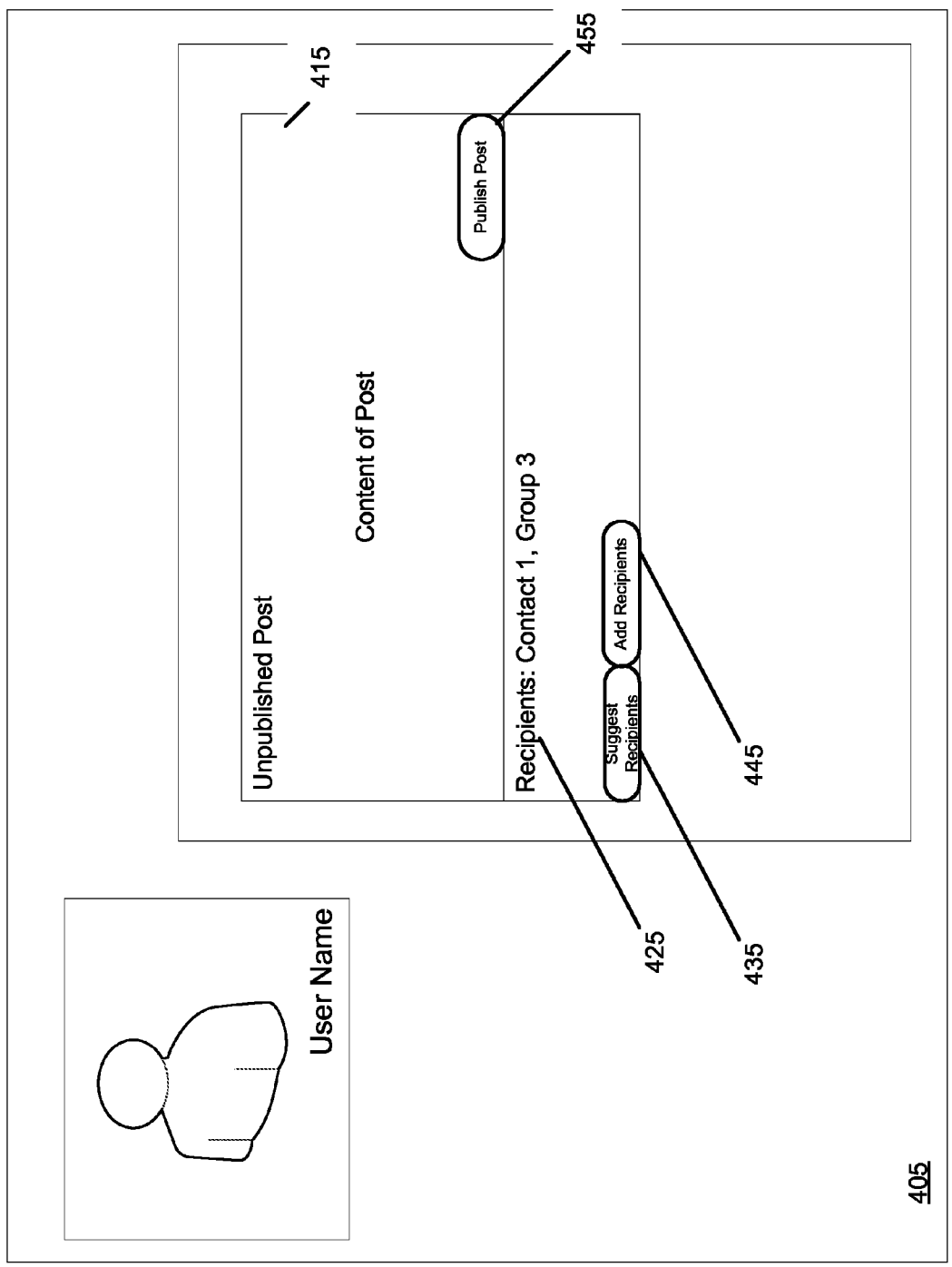
FIG. 4b is an illustration of an example user interface for suggesting a recipient of content.

FIG. 4*b* is an illustration of an example user interface 405 for suggesting a recipient of content. The user may input content for a post in a designated portion 415 of the user interface 405. During or following the user's completion of entering the content of the post, the recipient suggestion module 234 of server 130 can determine one or more types of content associated with the post. The user may explicitly designate recipients of the post 425 by designating an individual contact or a group of contacts. The user can designate recipients through graphical component 445. The user can publish the post through graphical component 455. The user can access suggested recipients through graphical component 435. Upon clicking, passing a mouse over, or otherwise selecting the suggested recipients graphical component 435, the user can be provided with a display of suggested recipients that have been chosen as recipients of the post based on the interest profiles of the suggested recipients and the type of content of the content that has been input in designated area 415. Although not illustrated, the user may be provided with suggested recipients without interacting with graphical component 435. Upon accessing the suggested recipients, the user may be provided with some or all of the suggested recipient's interest profile. The user may further be able to access some or all of the suggested recipient's interest profile by choosing a graphical component (not shown).

FIG. 4*c* is an illustration of another example user interface 407 for suggesting a recipient of content. The user interface 407 illustrates a user interface that allows the current user to view received posts 457 that have been sent from or posted by other contacts (or previously posted by the user herself) in a format which enables the user to re-post or share the received posts 457 with the user's contacts. The user may be presented with a group-centric recipient format 467, which allows the user to view an "interest meter" icon 427 associated with each received post 457. The "interest meter" can reflect the group interest profile of the selected group (e.g., recipient group 1 of FIG. 4*c*). The user may select a pre-existing group of contacts and view the "interest meter" before deciding to share that post with that group of recipients. The user may have pre-existing groups of contacts 437 and 447. In order to gauge the interest of recipient group 1, the user selects tab 447. The user may alternatively select recipient group 2 or recipient group 3 by selecting one of tabs 437. The "interest meter" icons 427 then display the interest of recipient group 1 for each of the displayed posts 457 based on a comparison of a group interest profile associated with recipient group 1 and the determined type of content of each of the posts 457. The "interest meter" icons 427 represent the percent interest of the recipient group. For instance, the top most "interest meter" icon 427 indicates approximately 25% interest for recipient group 1, while the bottom most "interest meter" icon 427 indicates approximately 90% interest for recipient group 1. Thus, the user can determine that content of post 3 is most likely to positively engage the contacts of recipient group 1. The user can then click, pass a mouse over, or otherwise select graphical component 417 to re-publish the post to the selected recipient group 1. The "interest meter" icon can be, in some examples, a graphical component that provides the user with additional interest profile information of the group or the members of the group upon clicking, passing a mouse over, or otherwise selecting the icon 427. Information regarding interest profiles of individual contacts or groups of contacts may be accessible through a menu entry for interest profiles 437.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject technology can be implemented as sub-parts of a larger program while remaining distinct software aspects of the subject technology. In some implementations, multiple software aspects can also be implemented as separate programs. Finally, any combination of separate programs that together implement a software aspect described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
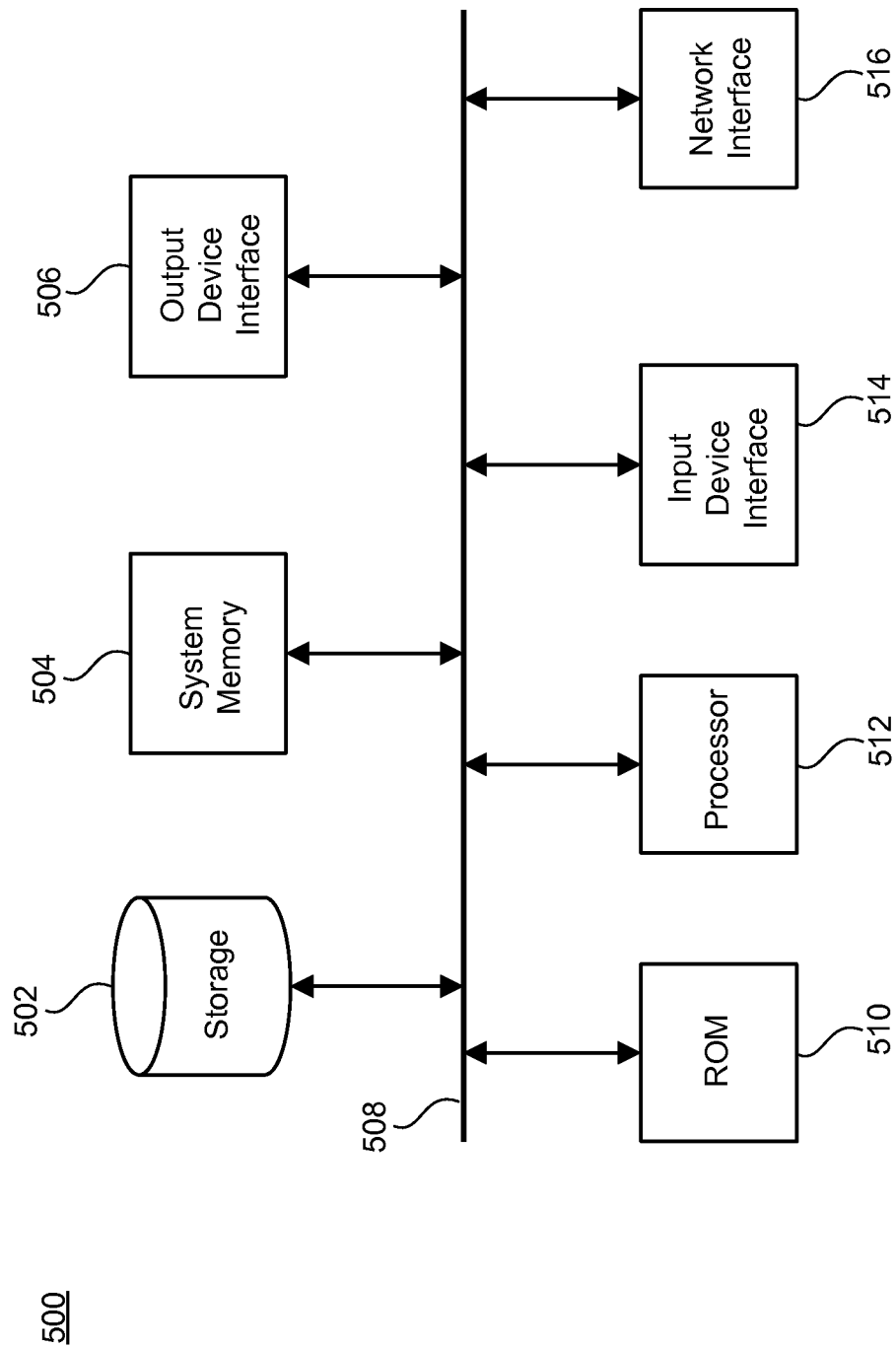
FIG. 5 is a block diagram illustrating an electronic system with which some implementations of the subject technology are implemented.

FIG. 5 conceptually illustrates an electronic system with which some implementations of the subject technology are implemented. Electronic system 500 can be a computer, phone, PDA, or any other sort of electronic device. Such an electronic system includes various types of computer-readable media and interfaces for various other types of computer-readable media. Electronic system 500 includes a bus 508, processing, unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject technology. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject technology use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as a random access memory. System memory 504 stores some of the instructions and data that the processor needs at runtime. In some implementations, the processes of the subject technology are stored in system memory 504, permanent storage device 502, and/or ROM 510. For example, the various memory units include instructions for suggesting a recipient of content in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers such as a local area network ("LAN"), a wide area network ("WAN"), or an Intranet, or a network of networks, such as the Internet. Any or all components of electronic system 500 can be used in conjunction with the subject technology.

These functions described above can be implemented in digital electronic circuitry, in computer software, firmware or hardware. The techniques can be implemented using one or more computer program products. Programmable processors and computers can be included or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Aspects of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method for suggesting a recipient of content, the method comprising:
    determining an interest profile of at least one contact of a user based on at least one endorsement action of the at least one contact directed to a type of content;
    determining a type of content of an unpublished post of the user;
    identifying the at least one contact as a suggested recipient of the unpublished post of the user, the identification based on the interest profile of the at least one contact and the type of content of the unpublished post of the user, wherein the at least one contact comprises a plurality of contacts, each contact of the plurality of contacts having a respective determined interest profile and wherein the suggested recipient is a group of suggested recipients comprising multiple ones of the plurality of contacts;
    aggregating the interest profiles of each suggested recipient of the group of suggested recipients to form a group interest profile corresponding to the group of suggested recipients; and
    providing for display the suggested recipient of the unpublished post of the user.

2. The method of claim 1, the method further comprising: providing for display of an indicator for each suggested recipient of the group of suggested recipients, wherein each indicator is based on the interest profile of each respective suggested recipient.

3. The method of claim 1, the method further comprising: providing for display an indicator based on a portion of the group interest profile.

4. The method of claim 1, wherein the group of suggested recipients comprises a user-established group of contacts.

5. The method of claim 4, the method further comprising: aggregating the interest profiles of each contact of the user-established group of contacts to form a group interest profile corresponding to the user-established group of contacts, wherein the group of suggested recipients is identified based on the group interest profile corresponding to the user-established group of contacts.

6. The method of claim 1, wherein the unpublished post of the user is a post for publication to a stream of content of another user.

7. The method of claim 1, wherein the unpublished post of the user comprises content associated with a portion of a user interface that is capable of sending content for display to another user.

8. The method of claim 1, wherein the endorsement action of the at least one contact comprises an indication of approval for a piece of content, a re-post of a piece of content, a number of views of a piece of content, or a comment on a piece of content.

9. The method of claim 1, wherein determining the interest profile of the at least one contact of the user comprises:
identifying at least one endorsement action of the at least one contact of the user; and
establishing the interest profile of the at least one contact of the user as a set of ratios, wherein the set of ratios corresponds to a number of endorsement actions for each endorsed type of content to a total number of endorsement actions of the at least one contact of the user.

10. The method of claim 1, wherein the step of providing for display is performed upon the receipt of a request input through a graphical component of a user interface.

11. The method of claim 1, further comprising:
providing for display an indicator based on a portion of the interest profile of the suggested recipient.

12. The method of claim 11, wherein the indicator comprises statistical information associated with the interest profile of the suggested recipient.

13. The method of claim 1, wherein a portion of the interest profile of the suggested recipient is accessible from the display of the suggested recipient.

14. A system for suggesting a recipient of content, the system comprising:
one or more processors; and
a memory containing processor-executable instructions that, when executed by the one or more processors, cause the system to:
determine an interest profile for each contact of a plurality of contacts of the user based on at least one endorsement action of the respective contact directed to a type of content;
determine a type of content of an unpublished post of the user;
identify multiple ones of the plurality of contacts as a group of suggested recipients of the unpublished post of the user, the identification based on the interest profiles of the multiple ones of the plurality of contacts and the type of content of the unpublished post of the user;
aggregate the interest profiles of each suggested recipient of the group of suggested recipients to form a group interest profile corresponding to the group of suggested recipients; and
provide for display the group of suggested recipients of the unpublished post of the user.

15. The system of claim 14, wherein the group of suggested recipients comprises a user-established group of contacts.

16. The system of claim 14, wherein the system is further caused to
provide for display of an indicator for each suggested recipient of the group of suggested recipients, wherein each indicator is based on the interest profile of each respective suggested recipient.

17. The system of claim 14, wherein the system is further caused to
provide for display an indicator based on a portion of the group interest profile.

18. The system of claim 14, wherein the endorsement action of each respective contact of the plurality of contacts comprises an indication of approval for a piece of content, a re-post of a piece of content, a number of views of a piece of content, or a comment on a piece of content.

19. The system of claim 14, wherein the system is caused to determine the interest profile of each contact of the plurality of contacts by causing the system to:
identify at least one endorsement action of the respective contact of the plurality of contacts of the user; and
establish the interest profile of the respective contact as a set of ratios, wherein the set of ratios corresponds to a number of endorsement actions for each endorsed type of content to a total number of endorsement actions of the respective contact.

20. The system of claim 14, wherein the system is caused to provide for display upon the receipt of a request input through a graphical component of a user interface.

21. The system of claim 14, wherein the system is further caused to
provide for display of an indicator based on a portion of the interest profiles of the group of suggested recipients.

22. The system of claim 21, wherein the indicator comprises statistical information associated with each interest profile of the suggested recipients of the group of suggested recipients.

23. The system of claim 14, wherein a portion of each interest profile of each suggested recipient of the group of suggested recipients is accessible from the display of the group of suggested recipients.

24. A non-transitory machine-readable storage medium comprising machine-readable instructions for performing a method for suggesting a recipient of content, the method comprising:
determining an interest profile for each contact of a plurality of contacts of the user base on at least one endorsement action of the respective contact directed to a type of content;
determining a type of content of art unpublished post of the user;
identifying multiple ones of the plurality of contacts as a group of suggested recipients of the unpublished post of the user, the identification based on the interest profiles of the multiple ones of the plurality of contacts and the type of content of the unpublished post of the user;
aggregating the interest profiles of each suggested recipient of the group of suggested recipients to form a group interest profile corresponding to the group of suggested recipients; and
providing for display the group of suggested recipients of the unpublished post of the user.

* * * * *